Oct. 8, 1968   M. G. LEONARD   3,405,283
ELECTRICAL TRANSFORMER APPARATUS
Filed Aug. 20, 1965
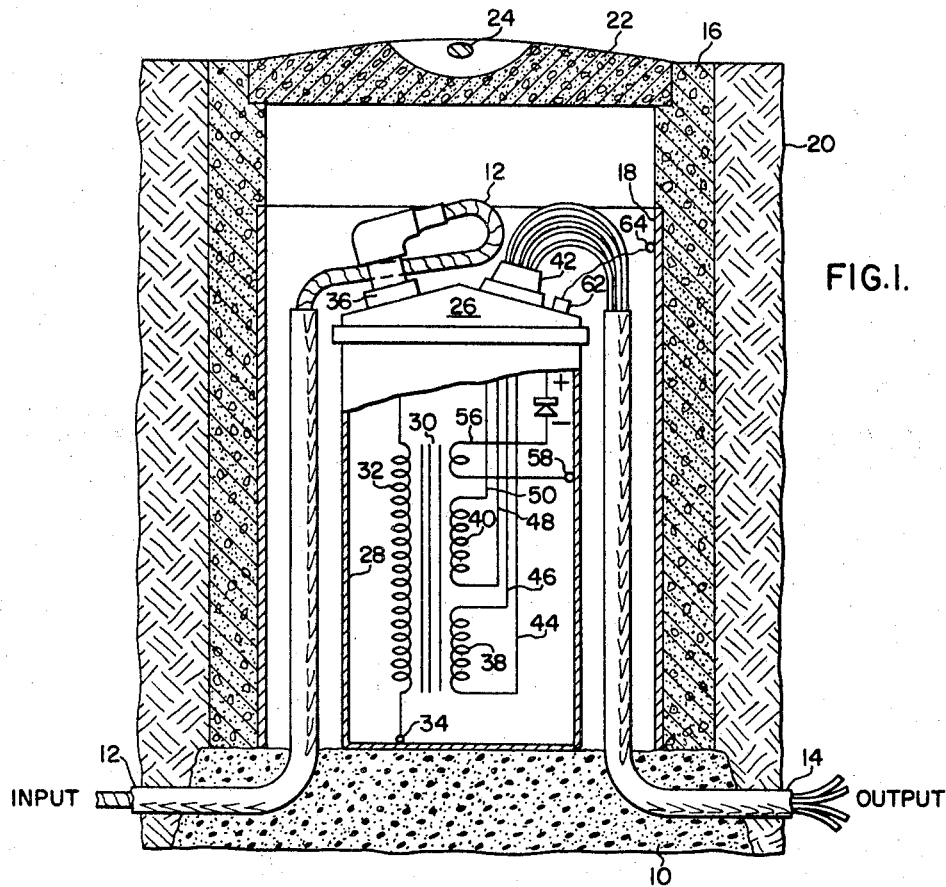
FIG.1.
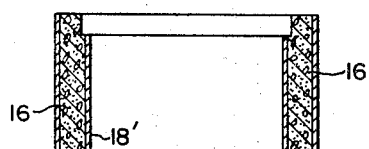
FIG.3.
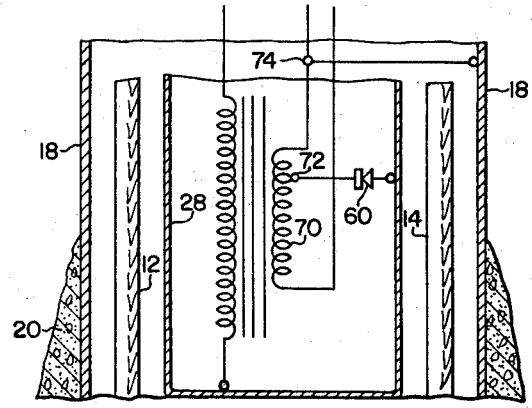
FIG.2.
FIG.4.
INVENTOR
Merrill G. Leonard
BY
*F. E. Browder*
ATTORNEY

United States Patent Office 3,405,283
Patented Oct. 8, 1968

3,405,283
ELECTRICAL TRANSFORMER APPARATUS
Merrill G. Leonard, Brookfield Township, Fowler, Ohio, assignor to Westinghouse Electric Corporation, Pittsburgh, Pa., a corporation of Pennsylvania
Filed Aug. 20, 1965, Ser. No. 481,250
9 Claims. (Cl. 307—95)

This invention relates to electrical transformer apparatus, and more particularly to electrical transformer apparatus that is installed for operation below ground level.

There is an increase in practice to install distribution transformers below the ground level, either in prefabricated vaults or directly buried in the earth. This type of installation has many advantages, but also introduces serious disadvantages. One serious disadvantage is a tendency to increase trouble with the installation because of undue or rapid corrosion of the transformer. Undue or rapid corrosion may result from one or all of three factors: (1) the greater variety of corrosive materials that may be present which can react chemically with the transformer casing wall, (2) the greater probability of water or moisture in contact with the casing for longer periods of time, and (3) the possibility of stray electrical currents in the earth which cause electrolytic action to corrode the metal of the tank casing.

There have been many proposed solutions to eleminate these disadvantages. One solution has been to use more expensive metal in the transformer tank casing, metal such as stainless steel, this solution has the disadvantage that it tremendously increases the cost of the transformer. Another proposed solution has been to apply many coats of expensive paint to the transformer casing. This solution is also expensive and has been found ineffective in some installations. A third proposal has been to keep the vault or enclosure in which the transformer is installed very dry. This proposal has also been found expensive and ineffective, and it also detracts from the cooling of the transformer installation.

This invention overcomes the ordinary electrolytic corrosion of the transformer casing and also stray corrosion due to electrical currents in the earth, which could cause electrolytic action to corrode the metal of the transformer casing, by providing an arrangement wherein the transformer protects itself against corrosion of the transformer casing by means of "cathodic" protection.

"Cathodic" protection consists of impressing electromotive forces on an underground structure through auxiliary anodes in such a way to make the entire structure cathodic with respect to the adjacent soil or earth. Although this procedure does not eliminate corrosion, it transfers the corrosion from the protected structure to the auxiliary anodes, which are more easily and economically replaceable.

Accordingly, it is an object of this invention to provide an underground transformer installation wherein the transformer protects itself from ordinary electrolytic corrosion and also electrolytic corrosion due to stray electrical currents in the earth which could cause electrolytic action to corrode the metal of the transformer casing.

It is another object of this invention to provide an underground transformer installation wherein the transformer casing is protected from corrosion due to stray electrical currents in the earth which could cause electrolytic action to corrode the metal of the transformer casing by means of an auxiliary anode which maintains the metallic transformer casing cathodic with respect to the adjacent soil or earth.

It is still another object of this invention to provide an underground transformer installation wherein corrosion of the metallic transformer casing due to stray electrical currents in the earth is eliminated by providing an auxiliary anode spaced from the metallic transformer casing and impressing a direct current voltage between the metallic transformer casing and the auxiliary anode to maintain the transformer casing cathodic with respect to the adjacent ground or earth.

These and other objects are effected by this invention as will be apparent from the following description taken in accordance with the accompanying drawings, forming a part of this application, in which:

FIG. 1 is a sectional view of a transformer installed below the ground level as disclosed by this invention;

FIG. 2 is a partial sectional view showing another embodiment of the invention disclosed in FIG. 1;

FIG. 3 is a sectional view of an auxiliary anode and casing arrangement that may be used with the invention disclosed in FIGS. 1 and 2; and FIG. 4 is a top view of FIG. 3.

In the description which follows, like reference characters represent like elements in all of the various figures.

FIG. 1 illustrates an installation of a distribution transformer below ground level wherein the distribution transformer is cathodically self-protected from corrosion due to ordinary electrolytic action and also due to stray electrical currents in the earth which would cause electrolytic action to corrode the metallic transformer casing. In the installation illustrated in FIG. 1, a hole or cavity, is first provided in the earth. Then a bed 10 of porous gravel is firmly tamped in the bottom of the hole. During the forming of the bed 10 of porous gravel an input cable 12 and an output cable 14 are placed into position through the gravel bed 10 and extended into the hole. After the input and output cables 12 and 14 have been properly positioned, a precast concrete casing or liner 16 is positioned in the hole and on the gravel bed 10. Closely fitted inside the precast concrete casing or liner 16 is an auxiliary metallic anode 18. This auxiliary anode 18 may be made from a metal selected from the group comprising aluminum, magnesium or zinc. The auxiliary anode 18 closely conforms to the inside of the precast concrete liner or casing 16 and it may be cast integral with the liner or casing 16 during the casting of the precast concrete liner or casing 16. The auxiliary anode 18 also makes good electrical contact with the gravel bed 10. The top of the precast concrete casing or liner 16 is positioned substantially level with the ground level. After the precast concrete liner or casing 16 has been positioned in the hole earth 20 is packed tightly all around the liner or casing 16. The top opening of the liner or casing 16 is closed with a precast concrete cover 22, which is provided with an eye or handle 24 for removing the cover 22 for inspection or service of the transformer. It is understood that the precast concrete casing or liner 16 may be any desired or required shape, such as round, rectangular, elliptical, or the like.

A distribution transformer 26 is then placed inside the liner or casing 16. The distribution transformer 26 comprises a metallic casing 28 which is usually made of some good grade of steel. The casing 28 encloses a magnetic core 30. The magnetic core 30 has a first or primary winding 32 inductively associated therewith. The lower end of the winding 32 is attached to the bottom of the transformer casing at 34 and the upper end of the first or primary winding 32 is connected through a terminal device 36 to the input or high voltage cable 12. The magnetic core 30 also has associated therewith a pair of second or secondary windings 38 and 40. The outputs from the secondary windings 38 and 40 are brought out of the transformer casing 28 through a bushing means 42. The output of the secondary winding 38 is connected through the bushing 42 by means of leads 44 and 46 and the output from the secondary winding 40 is connected through the bushing 42 by means of leads 48 and 50. The leads 44–46 and 48–50 may be connected in such a manner as to provide several different output voltages from the secondary windings 38 and 40. For example, a voltage of 120 volts may be obtained between the leads 44–46 and 48–50 or the leads may be connected so as to connect the secondary windings 38 and 40 in series circuit relationship to provide a voltage, such as 240 volts, across the two windings 38 and 40 connected in series.

An auxiliary winding 56 is also loosely coupled to the magnetic core 30. A small alternating current voltage is inductively induced in the auxiliary winding 56. As seen from FIG. 1, one end of the auxiliary winding 56 is connected at 58 directly to the transformer casing 28. The other end of the auxiliary winding 56 is connected to the cathode of a rectifier 60, and the anode of the rectifier 60 is connected through a bushing 62 and to the auxiliary anode 18 at point 64. The rectifier 60 rectifies the alternating current due to the alternating current voltage induced in the auxiliary winding 56 and applies the output as a direct current voltage between the auxiliary anode 18 and the metallic transformer casing 28. This direct current output voltage from the auxiliary coil 56 and the rectifier 60 is sufficient to always maintain the potential of the auxiliary anode 18 slightly above the potential of the metallic transformer tank 28. A difference of potential of +0.85 volt direct current has been found satisfactory. With the potential on the auxiliary anode 18 always slightly higher than the potential on the metallic transformer tank 28 the transformer tank 28 is cathodically protected against corrosion due to stray electrical currents in the earth which would cause electrolytic action to corrode the metal of the transformer casing 28. With the voltage output from the auxiliary coil 56 and the rectifier 60 always slightly higher than the potential of the transformer tank the current will flow from the auxiliary anode to the metallic transformer casing 28 thereby causing corrosion to take place from the auxiliary anode 18 to the ground or earth, instead of from the transformer casing 28 to the ground or earth. This method of cathodic protection of the transformer transfers the corrosion, which would normally take place in an underground installation, from the transformer casing 28 to the auxiliary anode 18. Although the auxiliary anode 18 may be economically manufactured to last for many years without completely deteriorating, even if they do rapidly deteriorate they may be replaced much more economically than the transformer casing 28. In any event, if the auxiliary anode 18 completely corrodes away before replacing it will not immediately put the transformer out of service, such as would happen if the transformer casing 28 should rapidly corrode away and develop leaks which would cause the transformer casing 28 to lose the dielectric which is used for cooling the core and coil assembly in the transformer casing 28. This method of preventing corrosion of the metallic casing of a transformer which is mounted underground is particularly adaptable to this type of installation since the stray electrical currents usually do not flow unless the transformer is excited or has an input voltage connected to the input or primary winding 32. With this installation any time that the input or primary winding 32 is excited, the auxiliary winding 56 is also excited and the auxiliary winding 56 and rectifier 60 is applying a direct current potential to the auxiliary anode 18 to provide cathodic protection for the metallic transformer casing 28. Thus, it is seen that any time the transformer 26 is excited, it is also cathodically protected to prevent corrosion of the transformer casing 28. This system eliminates any auxiliary power supplies such as batteries, or direct current power supplies, which would normally have to be provided for cathodically protecting other underground apparatus. In other words, the transformer 26 protects itself when excited, and the protection is applied automatically when the transformer is excited without the necessity of turning on auxiliary power supplies, and requires no additional switchgear or control apparatus to provide the protection.

FIG. 2 is a fragmentary sectional view of a transformer installation, with the transformer mounted underground identically as that illustrated in FIG. 1. The only difference in the installations illustrated in FIG. 1 and that illustrated in FIG. 2 being that a different design of transformer is installed underground. In the installation of FIG. 2 the transformer secondary comprises only one winding 70. Instead of obtaining the protective voltage from an auxiliary winding, as done in FIG. 1, a small number of turns of the secondary winding 70 is tapped between the taps 72 and 74 and the current due to this small voltage is rectified by the rectifier 60 and applied between the auxiliary anode 18 and the metallic transformer casing 28. This small voltage provides cathodic protection for the transformer 28 and prevents stray electrical currents in the earth 20 surrounding the transformer from causing corrosion of the metallic transformer casing 28 due to electrolytic action. In all other respects the installation in FIG. 2 is identical to the installation illustrated in FIG. 1.

FIG. 3 illustrates a second embodiment of the auxiliary anode and precast concrete casing 16. In the embodiment illustrated in FIG. 3 two auxiliary anodes 18 and 18' are provided concentrically with each other and the space in between the two auxiliary anodes 18 and 18' is filled with concrete. The auxiliary anodes 18 and 18' provide the form for casting the precast concrete casing 16. If desired, in order to eliminate making more than one electrical connection to the auxiliary anodes 18 and 18', the two auxiliary anodes 18 and 18' may be connected together through the concrete casing or liner 16 by means of electrical connectors 64 placed in the concrete during the casting, so that the electrical connectors 64 make good electrical connection to both of the auxiliary anodes 18 and 18'. With the electrical connectors 64 connecting the two auxiliary anodes 18 together it will only be necessary to make one electrical connection from the rectifier device 60 to the auxiliary anodes 18 or 18'. With the auxiliary anode and precast concrete casing or liner as illustrated in FIG. 3 the system would operate in the same manner as explained hereinbefore for FIGS. 1 and 2 for cathodically protecting the metallic transformer casing 28. The advantage of the arrangement of FIG. 3 being that more auxiliary anode material is provided and effective cathodic protection will be provided over a longer period of time, since both of the auxiliary anodes 18 and 18' are provided for corroding to the earth. FIG. 4 is merely a top view of FIG. 3 further illustrating the method for providing the electric connectors 64 in the precast concrete to electrically connect the two auxiliary anodes 18 and 18' together. As explained hereinbefore in connection with FIG. 1 the auxiliary anodes in the precast concrete casing or liner 16 of FIGS. 3 and 4 may be of any desired or required shape such as round, rectangular, triangular, elliptical or the like. Like in FIG. 3 the top of the casing or auxiliary liner 16 of FIG. 3 would also be closed by a precast concrete cover 22.

From the foregoing it is seen that the arrangement disclosed in this invention has provided dependable, economical protection for a metallic transformer casing which is mounted underground, which will prevent ordinary electrolytic corrosion and also corrosion due to stray electrical currents in the earth which would cause electrolytic action to destroy the transformer casing. This invention has also provided a system which is operated by the transformer itself, or, in other words, the transformer provides automatic protection for its metallic casing to prevent electrolytic action from corroding the transformer casing. Any time that the transformer is excited or energized, which is the time that stray currents are more apt to flow, the transformer is automatically protected. The protective system does not require any attention by an attendant or any auxiliary external power supplies, or batteries or the like.

The mere fact that the protective system requires no attention by service people makes it tremendously desirable over existing protective systems. The protective system provided by this invention is also more effective and more dependable than the systems previously tried in the prior art, such as more expensive corrosion resistant metal for the transformer casing, and multiple coats of paint on the transformer casing.

While this invention has been shown in several forms, it will be obvious to those skilled in the art that it is not so limited, but is susceptible of various changes and modifications without departing from the spirit thereof.

I claim as my invention:

1. In combination, a transformer comprising a metallic casing, a magnetic core in said casing, first winding means inductively associated with said magnetic core, means for connecting an input to said first winding means, second winding means inductively associated with said magnetic core so that a voltage is induced in said second winding means, an auxiliary metallic anode spaced from said metallic transformer casing, means rectifying a portion of the current due to voltage induced in said second winding means, and means connecting the output from said rectifying means between said metallic transformer casing and said auxiliary anode.

2. In combination, a transformer comprising a metallic casing, a magnetic core in said casing, first winding means inductively associated with said magnetic core, means for connecting an input to said first winding means, second winding means inductively associated with said magnetic core so that an alternating current voltage is induced in said second winding means, means for connecting an output from said second winding means, an auxiliary metallic anode spaced from said metallic transformer casing, tap means connected to said second winding for obtaining a voltage from said second winding, rectifying means connected in circuit relationship with said tap means and rectifying the alternating current due to the voltage across said tap means, and means connecting the output from said rectifying means between said metallic transformer casing and said auxiliary anode.

3. In combination, a transformer comprising a metallic casing, a magnetic core in said casing, first winding means inductively associated with said magnetic core, means for connecting an input to said first winding means, second winding means inductively associated with said magnetic core, means for connecting an output from said second winding means, an auxiliary anode spaced from said transformer casing, third winding means inductively associated with said magnetic core so that a voltage is induced in said third winding means, means rectifying the current flowing in said third winding means due to said induced voltage in said third winding means, and means connecting the output from said rectifying means between said transformer casing and said auxiliary anode.

4. In combination, a transformer comprising a metallic casing, a magnetic core in said casing, first winding means inductively associated with said magnetic core, means for connecting an input to said first winding means, second winding means inductively associated with said magnetic core, means for connecting an output from said second winding means, a metallic anode spaced from and surrounding said transformer casing, third winding means inductively associated with said magnetic core so that a voltage is induced in said third winding means, means rectifying the current flowing in said third winding due to said induced voltage in third winding means, and means connecting the output from said rectifying means between said transformer casing and said metallic anode surrounding said transformer casing.

5. In combination, a transformer comprising a metallic casing, a magnetic core in said casing, first winding means inductively associated with said magnetic core, means for connecting an input to said first winding means, second winding means inductively associated with said magnetic core, means for connecting an output from said second winding means, an auxiliary metallic anode spaced from said transformer casing, third winding means inductively associated with said magnetic core so that a voltage is induced in said third winding means, rectifying means in said casing and connected in circuit relationship with said third winding means for rectifying the current flowing in said third winding means due to said induced voltage in said third winding means, means connecting the output from said rectifying means to said transformer casing and said auxiliary metallic electrode.

6. In combination, a transformer comprising a metallic casing, a magnetic core in said casing, first winding means inductively associated with said magnetic core, means for connecting an input to said first winding means, second winding means inductively associated with said magnetic core, means for connecting an output from said second winding means, said transformer being positioned below the ground level, an auxiliary anode spaced from and surrounding said transformer casing, said auxiliary anode being below ground level, non-conducting casing means surrounding said auxiliary anode, said non-conducting casing means being below ground level, third winding means inductively associated with said magnetic core so that a voltage is induced in said third winding means, rectifying means positioned in said casing and connected in circuit relationship with said third winding means for rectifying the current flowing in said third winding means due to said induced voltage in said third winding means, and means connecting the output from said rectifying means between said transformer casing and said auxiliary metallic anode.

7. In combination, a transformer comprising a metallic casing, a magnetic core in said casing, first winding means inductively associated with said magnetic core, means for connecting an input to said first winding means, second winding means inductively associated with said magnetic core, means for connecting an output from said second winding means, said transformer being positioned below the ground level, a first auxiliary metallic anode spaced from said transformer casing and surrounding said transformer casing, a non-conducting casing surrounding said first auxiliary metallic anode, a second auxiliary metallic anode surrounding said non-conducting casing, said auxiliary anodes and said non-conducting casing being positioned below ground level, third winding means inductively associated with said magnetic core so that a voltage is induced in said third winding means, rectifying means in said casing and connected in circuit relationship with said third winding means for rectifying the current flowing in said third winding means due to said induced voltage in said third winding means, and means connecting the output from said rectifying means between said transformer casing and one of said auxiliary metallic anodes.

8. In combination, a transformer comprising a metallic casing, a magnetic core in said casing, first winding means inductively associated with said magnetic core, means for connecting an output to said first winding means, second winding means inductively associated with said magnetic core, means for connecting an output from said second winding means, said transformer being located below ground level, an auxiliary anode spaced from said transformer, said auxiliary anode being located below ground level, said auxiliary anode being constructed from a metallic conductor selected from the group comprising aluminum, magnesium and zinc, a third winding means inductively associated with said magnetic core so that a voltage is induced in said third winding means, means in said casing and connected in circuit relationship with said third winding means for rectifying the current flowing in said third winding means due to said induced voltage in said third winding means, and means connecting the output from said rectifying means between said transformer casing and said auxiliary metallic anode.

9. In combination, a transformer comprising a metallic casing, a magnetic core in said casing, first winding means inductively associated with said magnetic core, means for connecting an input to said first winding means, second winding means inductively associated with said magnetic core, means for connecting an output from said second winding means, said transformer being positioned below ground level, an auxiliary metallic anode spaced from said transformer casing and surrounding said transformer casing, said auxiliary metallic anode being positioned below ground level, third winding means inductively associated with said magnetic core so that a voltage is induced in said third winding means, rectifying means in said casing and connected in circuit relationship with said third winding means for rectifying the current flowing in said third winding means due to said induced voltage in said third winding means, and means connecting the output from said rectifying means to said transformer casing and said auxiliary metallic electrode.

References Cited

UNITED STATES PATENTS

| | | | |
|---|---|---|---|
| 1,907,400 | 5/1933 | Davis | 307—95 |
| 2,100,721 | 11/1937 | Parsons | 174—37 |
| 2,435,973 | 2/1948 | McTaggart et al. | 204—147 |
| 3,020,216 | 2/1962 | Bradley | 204—196 |
| 3,055,813 | 9/1962 | Schaschl et al. | 204—147 |

ROBERT K. SCHAFFER, *Primary Examiner.*

D. SMITH, *Assistant Examiner.*